United States Patent Office 3,454,660
Patented July 8, 1969

3,454,660
MANUFACTURE OF CHLORINATED
HYDROCARBONS
Robert Charles Henri Chuffart, Weston Point, Runcorn,
England, assignor to Imperial Chemical Industries
Limited, London, England, a corporation of Great
Britain
No Drawing. Filed Sept. 24, 1965, Ser. No. 490,131
Claims priority, application Great Britain, Oct. 8, 1964,
41,108/64
Int. Cl. C07c 21/04, 19/06
U.S. Cl. 260—654　　　　　　　　　　　　　　　　　2 Claims

ABSTRACT OF THE DISCLOSURE

There is provided a process for the manufacture of carbon tetrachloride and perchloroethylene by reacting a chlorinated hydrocarbon feed containing tetrachlorobutadiene and/or pentachlorobutadiene in the liquid phase with chlorine at temperatures between 20° and 100° C. The tetrachloro and/or pentachloro butadiene is thereby converted to the hexachloro and heptachloro butene, respectively. This prechlorinated feed is subsequently reacted in the vapor phase with an excess of chlorine to produce the perchlorinated products. The process prevents the formation of tarry matter normally accompanying the chlorination reaction of tetrachloro and pentachloro butadiene in the vapor phase.

---

This invention relates to the manufacture of carbon tetrachloride and perchloroethylene.

Chlorinated hydrocarbons containing for example 2 and 4 carbon atoms in the molecule may be chlorinated in the presence or absence of a catalyst at temperatures in the range 450° C. to 700° C. to give perchloroethylene and carbon tetrachloride. However, practical difficulties arise when tetrachlorobutadiene and/or pentachlorobutadiene or chlorinated hydrocarbon mixtures containing the chlorobutadienes are so chlorinated. These difficulties arise since in vapourisation of the feed stock the said chlorobutadienes decompose to form tarry matter which can cause charring on heating tubes and this in turn means poor heat transfer to the stock being volatilised. Again in such vaporisers there can be carry-over of liquid containing the chlorobutadienes or degradation products thereof which foul the reactor. Also it is usually necessary to purge such vaporisers with an inert gas for a considerable time but this does not solve the problem of the deposition of the tarry matter.

According to the present invention I provide an improved process for the manufacture of carbon tetrachloride and perchloroethylene wherein these difficulties are overcome which comprises chlorinating in the liquid phase a chlorinated hydrocarbon feed comprising tetrachlorobutadiene and/or pentachlorobutadiene and thereafter submitting the reacted gases to chlorination in the vapour phase.

Although a wide range of temperatures may be employed in the liquid phase reaction, this prechlorination step is preferably carried out at a temperature in the range 20° C. to 100° C. In this chlorination step the tetrachlorobutadiene is converted to hexachlorobutene and the pentachlorobutadiene is converted to heptachlorobutene. This prechlorination step could be carried out in the presence of a catalyst such as ferric chloride. However the prechlorination proceeds quite satisfactorily in the absence of such a catalyst and the carryover of ferric chloride into the vapour phase chlorinator is avoided.

The chlorinated hydrocarbon feed may also contain chlorinated hydrocarbons containing 2 carbon atoms and/or 4 carbon atoms (in addition to said chlorobutadiene(s)).

The source of chlorinated hydrocarbons containing 2 and 4 carbon atoms may contain various proportions of different chlorinated hydrocarbons. These chlorinated hydrocarbons containing 2 carbon atoms may be saturated or unsaturated and there may be present saturated, chlorinated hydrocarbons containing 4 carbon atoms. Suitable sources are, for example, the by-products obtained in the liming and in the cracking of sym. tetrachloroethane which give trichloroethylene as the desired product. Thus a mixed chlorinated hydrocarbon feed obtained as a by-product in the liming of sym. tetrachloroethane and containing approximately 30% by weight perchloroethylenes, 9% by weight sym. tetrachloroethane, 15% by weight hexachloroethane, 21% by weight tetrachlorobutadiene and 2% by weight hexachlorobutadiene, the remainder consisting essentially of high boiling chlorinated hydrocarbons, may be chlorinated at about 30° C. to convert the tetrachlorobutadiene to hexachlorobutene.

Suitably the chlorinated hydrocarbons leaving the prechlorinator are chlorinated in the vapour phase in a reactor containing a catalyst such as active charcoal impregnated with sodium sulphate at a temperature in the range 450° C. to 500° C. to give carbon tetrachloride and perchloroethylene. The prechlorinated hydrocarbons are converted to carbon tetrachloride and perchloroethylene. The catalyst is capable of converting any hexachlorobutadiene present in the feed to this reactor to carbon tetrachloride and perchloroethylene.

Again the chlorinated hydrocarbons leaving the prechlorinator may be subjected to chlorination in the vapour phase in an empty reactor or fluidised bed reactor wherein the bed is, for example, sand and is maintained at somewhat higher temperatures in the range 500° C. to 700° C. to give carbon tetrachloride and perchloroethylene.

Another system which may be used is one wherein the chlorinated hydrocarbons leaving the prechlorinator are reacted with chlorine to give $CCl_4$ and $C_2Cl_4$ in an empty reactor or fluidised bed reactor wherein the bed is of sand maintained at a comparatively low reaction temperature of 400° C. to 500° C. The desired products, namely perchloroethylene and carbon tetrachloride are recovered from the reaction gases and a comparatively small amount of chlorinated hydrocarbon residues, including hexachlorobutadiene, is then fed to the reactor containing a catalyst as previously described.

Such chlorination processes in the vapour phase give a mixed product of $CCl_4$ and $C_2Cl_4$, and proportion of these components in the product being dependent on the operating conditions such as $Cl_2$/organic ratio, presence or absence of a catalyst and reaction temperature.

In the chlorination reaction in the vapour state chlorine is used in an amount in excess of that required to perchlorinate the feed entering the reactor or reactors. It may be arranged that chlorine diluted with hydrogen chloride leaving the vapour phase reactor is fed to the prechlorinator. The vapour phase reaction may also be carried out in the presence of hydrogen chloride.

The following example illustrates but does not limit the invention.

EXAMPLE

Into a large mild steel tank fitted with an inlet pipe for chlorine were situated 20 tons of a liquid mixture consisting essentially of chlorinated hydrocarbons containing 2 and 4 carbon atoms including tetrachlorobutadiene. There was also provided a recirculation pump which served to withdraw the reaction medium from the tank and pass it through a cooler and back to the tank. Chlorine was fed into the liquid mixture at the rate of 30 to 50 m.³/hr. The reaction temperature was maintained at 50° C.

The table gives the composition of the mixture (percent by weight) before and after chlorination.

TABLE

| Compound | B.P., °C | Chlorinated time, hrs. 0 | 30 |
|---|---|---|---|
| $CCl_4$ | | 1.5 | 1.5 |
| $C_2HCl_3$ | | 11.5 | 7.5 |
| $C_2Cl_4$ | | 17.0 | 15.0 |
| $C_2H_2Cl_4$ | | 1.0 | 1.0 |
| $C_2HCl_5$ | | 1.0 | 2.0 |
| $C_2Cl_6$ | | 14.0 | 10.0 |
| $C_4H_2Cl_4$ | | 29.0 | 0.1 |
| Chlorinated $C_4$ hydrocarbons of unknown composition | 205 | 9.0 | 1.3 |
| | 210 | 6.0 | 8.0 |
| | 215 | 2.3 | 1.6 |
| $C_4Cl_6$ | | 4.0 | 2.6 |
| $C_4H_2Cl_6$ [1] | 235 | 0.3 | 22.0 |
| $C_4H_2Cl_6$ [1] | 245 | 0.2 | 11.0 |
| Other high boiling chlorinated hydrocarbons | | <1 | <1 |

[1] Isomers.

The reaction rate (as determined by reaction in a small scale reactor) was found to be fast but as heat exchange facilities on the present large plant were insufficient the chlorine was metered in carefully and the run allowed to take the longish period of 30 hours. Even so analysis of the product after 15 hours was basically the same as that after 30 hours.

0.1 ton of this chlorinated material was mixed with a source of chlorinated hydrocarbons which required processing which was free from tetrachlorobutadiene and which contained 40% $C_2Cl_4$, 45% $C_2Cl_6$ and 15% $C_4Cl_6$. The resulting mixture was vaporised, chlorine was added to the vapours and the vaporised mixture was fed to a reactor maintained at 480° C. and containing a catalyst which was activated charcoal impregnated with sodium sulphate. Chlorine was added to the said vaporised mixture in amount such that 20% by volume of unreacted chlorine remained in the vapours leaving the reactor.

The organic vapours leaving the reactor initially contained 35% by weight $CCl_4$, 55% by weight $C_2Cl_4$ and 10% of a crude product containing hexachloroethane. Now owing to catalyst deactivation the $CCl_4$ content of the exit vapours drops with operating time and the catalyst life is arbitrarily estimated by the time taken for the $CCl_4$ content of the vapours to drop to 10% by weight. In this example it was found that the catalyst life was 15 days of continuous running. (The vapours then still contained 70% by weight $C_2Cl_4$ and 20% by weight of crude hexachloroethane).

Comparison

By way of comparison 0.1 ton of the material disclosed in the table which had not been chlorinated in the liquid phase and therefore contained a large amount of tetrachlorobutadiene was added to 1 ton of the chlorinated hydrocarbon mixture (A). The resulting mixture was vaporised and was submitted to a vapour phase chlorination reaction under the conditions indicated in the example. In this run the catalyst life (as estimated in the example) was found to be only 5 days of continuous running.

What we claim is:

1. A process for the manufacture of carbon tetrachloride and perchloroethylene which comprises prechlorinating a chlorinated hydrocarbon feed containing a chlorinated compound selected from the group consisting of tetrachlorobutadiene and pentachlorobutadiene and mixtures thereof by reacting the feed in the liquid phase at temperatures between 20° and 100°. with chlorine, whereby the said chlorinated compounds are converted to hexachlorobutene and heptachlorobutene, respectively, and thereafter reacting the so prechlorinated feed in the vapour phase at 450° C. to 500° C. and in the presence of a catalyst which is activated charcoal impregnated with sodium sulphate with an amount of chlorine in excess of that required to produce the said perchlorinated products.

2. A process for the manufacture of carbon tetrachloride and perchloroethylene which comprises prechlorinating a chlorinated hydrocarbon feed containing a chlorinated compound selected from the group consisting of tetrachlorobutadiene and pentachlorobutadiene and mixtures thereof by reacting the feed in the liquid phase at temperatures between 20° and 100° C. with chlorine, whereby the said chlorinated compounds are converted to hexachlorobutene and heptachlorobutene, respectively, and thereafter reacting the so prechlorinated feed in the vapour phase at 500° to 700° C. in the presence of a fluidised bed of sand with an amount of chlorine in excess of that required to produce the said perchlorinated products.

References Cited

FOREIGN PATENTS 535,644   1/1957   Canada.
953,285   3/1964   Great Britain.
250,563   3/1963   Japan.

BERNARD HELFIN, *Primary Examiner.*

J. BOSKA, *Assistant Examiner.*

U.S. Cl. X.R.

260—664